June 8, 1971   K. MULLER   3,583,072
TESTING APPARATUS FOR TOTAL SINGLE-FLANK COMPOSITE
ERRORS IN CYLINDRICAL GEARS
Filed Oct. 6, 1969   3 Sheets-Sheet 1

INVENTOR
KARL MULLER

BY McGlew and Toren
ATTORNEYS

INVENTOR
KARL MULLER

BY McGlew and Toren
ATTORNEYS

United States Patent Office 3,583,072
Patented June 8, 1971

3,583,072
TESTING APPARATUS FOR TOTAL SINGLE-FLANK COMPOSITE ERRORS IN CYLINDRICAL GEARS
Karl Muller, Zurich, Switzerland, assignor to Maag Gear Wheel & Machine Company Limited, Zurich, Switzerland
Filed Oct. 6, 1969, Ser. No. 864,029
Claims priority, application Germany, Oct. 10, 1968, P 18 02 363.7
Int. Cl. G01m 13/02
U.S. Cl. 33—179.5                3 Claims

ABSTRACT OF THE DISCLOSURE

A testing apparatus for total single-flank composite errors in cylindrical gears by indicating deviation from the uniform transmission of the angular motion from a first gear of a pair of intermeshing gears to the second gear. The first gear is rotated by a first disk in rolling contact with a first straight edge. This straight edge is translationally driven by a slide. The slide has an angularly settable arrangement to determine the ratio of the amount of movement of the slide to the amount of movement the first straight edge which in turn rotates the first disk. The second gear, in mesh with the first gear, is caused to rotate by this meshing. Coaxial with the second gear is a second disk which is free to rotate with respect to the second gear. The second disk is in rolling contact with a second straight-edge which second straight-edge is translationally driven by the same slide that drives the first straight edge. Measuring apparatus measures the rotation of the second gear with respect to the second disk. The angularly adjustable arrangement is set in accordance with the gear tooth ratio of the meshed gears so that if the gears had no errors the measuring apparatus would sense no motion of the second disk relative to the second gear. Errors in the gears will result in the measuring apparatus sensing the relative motion of the second gear to the second disk.

---

This invention relates to a total single-flank composite error testing apparatus for cylindrical gears in which two intermeshing gearwheels which are to be tested mesh with each other at a fixed centre distance from each other, and are each connected to a rolling disc, one disc for each gearwheel, which is independent of the gear transmission ratio and is adapted to roll, without slip, on a straightedge, and a sliding block, mounted on the straightedge of one said rolling disc, is guided on a control bar, mounted at an adjustable angle on a measuring slide, which measuring slide in turn is connected to the straightedge of the other rolling disc, one of the two paths connecting the measuring slide to the drives of each gearwheel being interrupted and being bridged by measuring apparatus.

Apparatus of the aforementioned construction is suitable for testing the total single-flank composite errors which results when two gearwheels to be tested mesh with each other, or if a gearwheel to be tested meshes with a master gearwheel. The gearing errors are measured as the total errors relative to the deviation from the required uniform transmission of rotation from one wheel to the other.

In known apparatus of the kind heretofore described, the straightedges are guided perpendicularly relative to each other, one of which is parallel to the measuring slide. The measuring apparatus is mounted on the measuring slide so that measurement detects whether and to what extent rotation of the geardrive under test causes one of the straightedges to lead or lag relative to the measuring slide, displacement of which accompanies rotation of the geardrive under test. The control bar is so adjusted that any relative motion between the measuring slide and the straightedge disposed in parallel to the direction of movement of the measuring slide occurs only if at least one gearwheel of the geardrive under test is affected by gearing errors (U.S. Pat. No. 3,031,765).

In another known total single-flank composite error testing apparatus (U.S. Pat. No. 2,602,236), of a kind different from that initially described, the two straightedges extend in parallel to each other, namely, in parallel to the direction of movement of one slide on which the two gearwheels under test, together with their rolling discs, are supported. Of the two straightedges, only one is displaceable along its longitudinal axis; longitudinal displacements of this one straightedge, resulting from gearing errors, are measured by a stationary measuring apparatus.

This apparatus suffers from the disadvantage that the transmission ratio between the two rolling discs must correspond accurately to the transmission ratio of the gearwheels under test, so that a separate pair of rolling discs must be provided and fitted into the apparatus for testing geardrives having different transmission ratios.

The object of the present invention is to provide a total single-flank composite error testing apparatus in which, in the same way as in the known apparatus for testing geardrives of different transmission ratios, the same rolling discs are used at all times, but which require less space than the known apparatus.

In a total single-flank composite error testing apparatus of the kind heretofore described, this problem is solved, according to the present invention, in that the two straightedges are disposed parallel to each other, the straightedge of such other rolling disc carries a sliding block which is guided on a second control bar mounted on the measuring slide, and the measuring apparatus is adapted to measure rotation of one gearwheel under test relative to the rolling disc associated therewith.

In a preferred embodiment of the present invention, the second control bar is adjustable on the measuring slide into two positions each of which deviates by 45° from the direction of travel of the measuring slide. By pivoting the second control bar through 90° the conditions governing motion may be reversed in such a way as to permit the optional testing of pairs of intermeshing gearwheels having one internally-toothed wheel and one externally-toothed wheel, or having two externally-toothed wheels.

At least one clutch may be disposed between each rolling disc and the gearwheel under test associated therewith; this offers the advantage of permitting the testing of gearwheels having a very large number of teeth, or over at least one complete revolution of the gearwheels.

The invention avoids difficulties which arise in known apparatus of the kind heretofore described if the centre spacing between the gear-wheels under test must be kept very small, particularly for the testing of internally-toothed cylindrical gears.

One embodiment of the invention is explained hereinafter by reference to the accompanying diagrammatic drawings, in which:

FIG. 4 is a view similar to FIG. 1, but showing the apparatus when testing a pair of intermeshing gearwheels, both of the gear-wheels being externally toothed.

Figure 2:
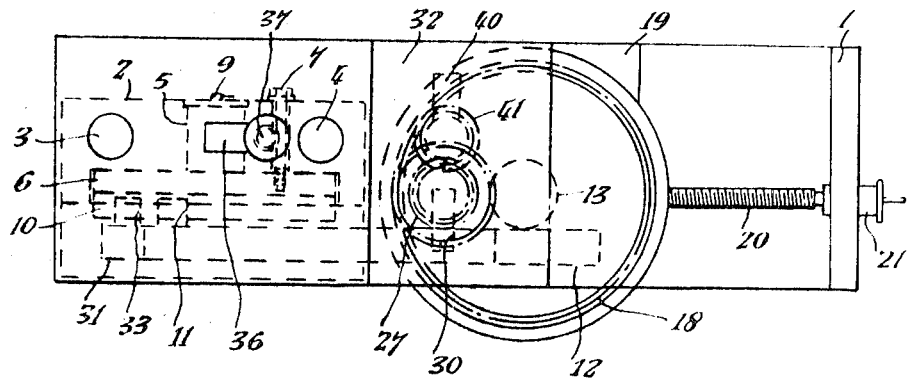
FIG. 2 is a plan view corresponding to FIG. 1.
Figure 3:
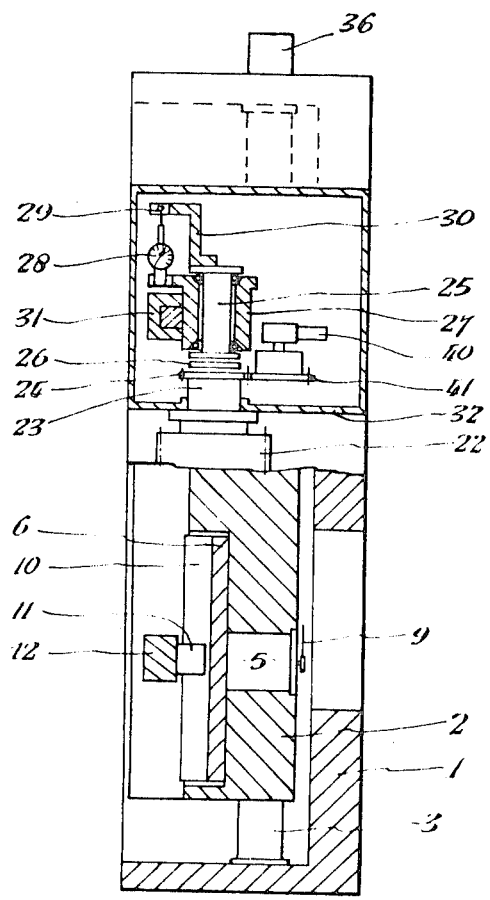
FIG. 3 is a sectional elevation, taken on the line III—III in FIG. 1.
Figure 6:
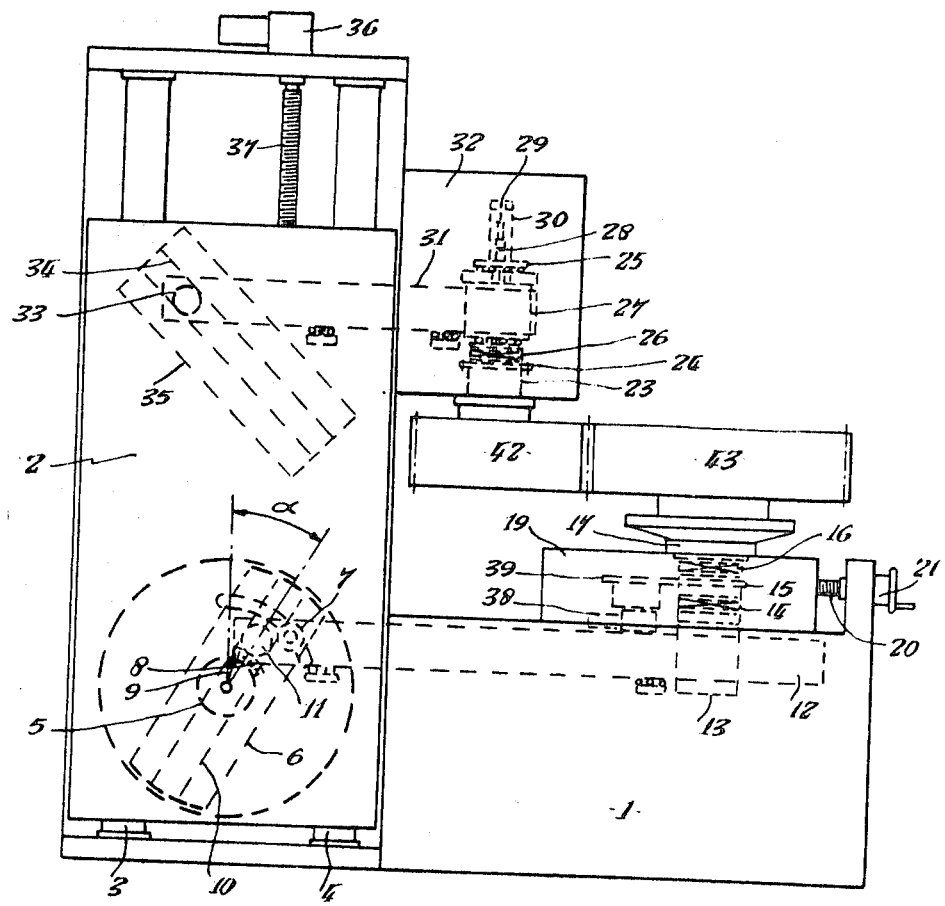

A measuring slide 2 is adapted to slide vertically on guides 3 and 4 mounted on a bed 1 of a total single-flank composite error testing apparatus. A control bar 6 is supported on a spindle 5 so as to be angularly adjustable, and a screw 7 is provided for locking the control bar in a selected angular position. The angular setting α is indicated on a scale 8 by a pointer 9 on the spindle 5. The control bar 6 has a longitudinal rectilinear groove 10 in which a sliding block 11 is guided. The sliding block 11 is mounted on a straightedge 12 which is guided for horizontal sliding on the bed 1. The straightedge 12 bears on a rolling disc 13 by means of magnetic force and rolls on disc 13 without slip. A clutch 14, a gearwheel 15, a second clutch 16 and a mandrel 17 are disposed on the same vertical axis as the rolling disc 13. An internally-toothed cylindrical gear 18, which is one of the two intermeshing gearwheels which are to be tested, is mounted on the mandrel 17 in the arrangement shown in FIGS. 1 to 3. The mandrel 17 is supported on a slide 19 which can be adjusted horizontally on the bed 1 by means of a screw spindle 20 and a handwheel 21 in order to set up the desired centre spacing between the two intermeshing gearwheels which are to be tested.

An externally-toothed gearwheel 22, which is to be tested while meshing with the gearwheel 18, is mounted, together with a gearwheel 24, on a vertical spindle 23. The lower end of a shaft 25 is connected by way of a clutch 26 to the spindle 23. A rolling disc 27 is mounted on the shaft 25. A dial indicator 28, having a probe 29 which engages in a slit in a bracket 30 mounted on the shaft 25, is disposed in a recess in the rolling disc 27. Rotation of the shaft 25 relative to the rolling disc 27 is indicated by the dial indicator 28.

The rolling disc 27 is magnetically thrust on to a straightedge 31 and rolls thereon without slip. The straightedge 31 is mounted for horizontal sliding movement in a head 32 which is mounted on the bed 1 and in which the spindle 23 is journalled. A sliding block 33 is mounted on the straightedge 31 and engages a rectilinear groove 34 disposed longitudinally in a second control bar 35 which is mounted on the measuring slide 2.

A motor 36 with a screwthreaded spindle 37 is provided for the vertical displacement of the measuring slide 2. A motor 38, applying a torque onto the gearwheel 15 by way of a hydraulic, non-rigid clutch and gearwheel 39, is provided to exert a specific flank pressure on the left-hand or right-hand tooth flanks of the gearwheels under test. An additional motor 40 is provided to apply a torque on to the gearwheel 24 by way of a hydraulic clutch and a gearwheel 41. Depending on the magnitude and direction of the said torques, the left-hand or right-hand flanks of the gearwheels under test will be more or less loaded.

If the measuring slide 2 is vertically displaced, and the clutches 14, 16 and 26 are engaged, the gearwheel 18 under test will be driven by way of the control bar 6, the sliding block 11, the straightedge 12 and the rolling disc 13. At the same time the rolling disc 27 is driven by way of the control bar 35, the sliding block 33 and the straightedge 31. With an appropriate angular adjustment of the control bars 6 and 35, and if the meshing of the two gears 18 and 22 is free of errors (total single-flank composite error=zero), the rolling disc 27 will rotate in the same manner as the gearwheel 22 under test. However, the gearwheel 22 is driven by the gearwheel 18, and any total single-tooth composite errors in the intermeshing gearwheels under test will affect the rotating motion of the gearwheel 22; the resultant differences in the angle of rotation relative to the theoretically correct rotation of the rolling disc 27 is indicated by the dial indicator 28.

If the angular setting of the second control bar 35 on the measuring slide 2 is assumed to be 45° from vertical, so that a certain vertical movement of the measuring slide corresponds to the movement of the straightedge 31 in the horizontal direction, and if the diameters of the two rolling discs 13 and 27 are assumed to be identical, the angular setting of the first control bar 6 from vertical may be obtained from the formula:

$$\text{Tan } \alpha = \frac{\text{Number of teeth on small gearwheel under test}}{\text{Number of teeth on large gearwheel under test}}$$

If the travel of the measuring slide 2 is insufficient to allow the larger wheel 18 of the two gearwheels under test to carry out a full revolution, or if more than one revolution of the two intermeshing gearwheels under test is to be checked, the clutches 14, 16 and 26 will be disengaged at the limit of the upward travel of the measuring slide 2, the measuring slide is then returned to its starting position while the gearwheels under test remain stationary, and the clutches are re-engaged in the starting position of the measuring slide; testing may then be continued.

Apparatus for continuously recording the measured values, to facilitate evaluation of the measuring procedure may be provided in place of the dial indicator 28.

Figure 1:
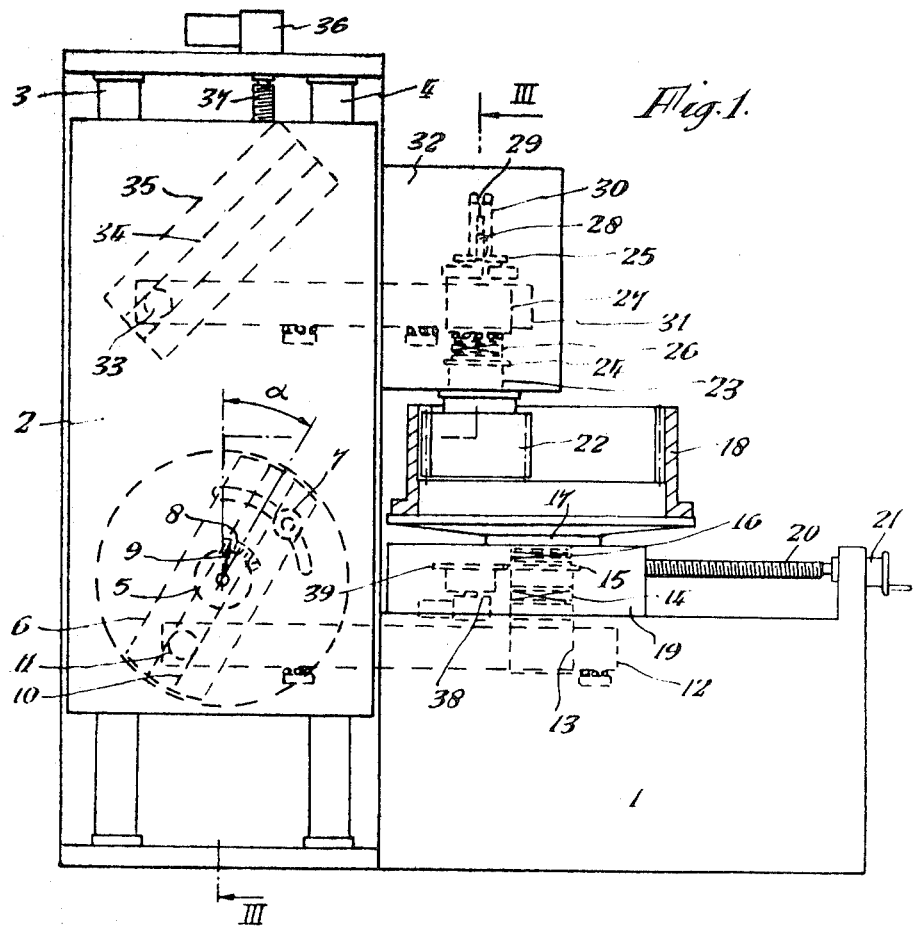
FIG. 1 is a side elevation of a total single-flank composite error testing apparatus, shown testing a pair of intermeshing gearwheels, one of the two gearwheels being internally toothed and the other externally toothed.

In the arrangement of the apparatus shown in FIG. 4 for the testing of two intermeshing externally-toothed gearwheels 42, 43, the second control bar 31 is pivoted through an angle of 90° relative to its position shown in FIG. 1. Accordingly, a rotation opposite to that of the gearwheel 43 under test is imparted to the gearwheel 42 under test. The formula for the angular setting of the control bar 6, and all other relationships described with respect to FIGS. 1 to 3 remain unchanged.

Instead of pivoting the scond control bar 35 for the testing of externally-toothed gearwheels through an angle of 90° from the position shown in FIG. 1, the first control bar 6 may be pivoted into a position which symmetrical relative to the vertical, that is, the angle α is on the left, in FIG. 4, of the vertical line through the axis of the pin 5, instead of being on the right of that line as shown in FIG. 1, so that the direction of rotation of one gearwheel under test is reversed relative to the other gearwheel. However, in this case the scale 8 must be extended to include a substantially larger angular range than shown in FIG. 4.

What I claim and desire to secure by Letters Patent is:

1. In total single-flank composite error testing apparatus for cylindrical gears, of the type in which two intermeshing gearwheels, which are to be tested, mesh with each other at a fixed center distance from each other, with each gearwheel being connected to a respective rolling disc which is independent of the gear transmission ratio and is adapted to roll, without slip, on a respective straight edge, and in which a sliding block, mounted on the straight edge associated with one rolling disc, is guided on a control bar, mounted at an adjustable angle on a measuring slide which, in turn, is connected to the straight edge associated with the other rolling disc, and with one of the two paths connecting the measuring slide to the drives of each gear wheel being interrupted and being bridged by measuring apparatus, the improvement comprising, in combination, means mounting said two straight edges in parallel relation to each other; a second sliding block carried by the straight edge associated with said other rolling disc; and a second control bar mounted on said measuring slide and guiding said second sliding block; said measuring apparatus being adapted to measure rotation of one gearwheel under test relative to the rolling disc associated therewith.

2. In total single-flank composite error testing apparatus, the improvement claimed in claim 1, including means mounting said second control bar adjustably on said measuring slide for adjustment to either of two separate positions, each of which positions deviates by 45° from the direction of travel of said measuring slide.

3. In total single-flank composite error testing apparatus, the improvement claimed in claim 1, including at least one clutch disposed between each rolling disc and the gearwheel under test operatively associated therewith.

References Cited

UNITED STATES PATENTS 2,602,236  7/1952  Muller _____ 33—179.5
3,031,765  5/1962  Muller _____ 33—179.5

FOREIGN PATENTS 681,719  10/1962  Great Britain _____ 73—162

S. CLEMENT SWISHER, Primary Examiner
D. E. CORR, Assistant Examiner

U.S. Cl. X.R.

73—162